June 30, 1936.    G. H. JETT    2,045,780
PRESSURE VACUUM VALVE
Filed July 28, 1934    2 Sheets-Sheet 1

George H. Jett, Inventor
By  Young, Attorney

June 30, 1936.  G. H. JETT  2,045,780
PRESSURE VACUUM VALVE
Filed July 28, 1934   2 Sheets-Sheet 2

George H. Jett Inventor
By P. L. Young Attorney

Patented June 30, 1936

2,045,780

UNITED STATES PATENT OFFICE 2,045,780

PRESSURE VACUUM VALVE

George H. Jett, Brooklyn, N. Y., assignor to Butterworth System Incorporated

Application July 28, 1934, Serial No. 737,360

5 Claims. (Cl. 277—45)

This invention relates to improvements in a double acting valve.

The invention will be fully understood from the following description taken in connection with the accompanying drawings in which latter—

Fig. 7 is a cross sectional view taken through the cylindrical frame; and

Figure 2:
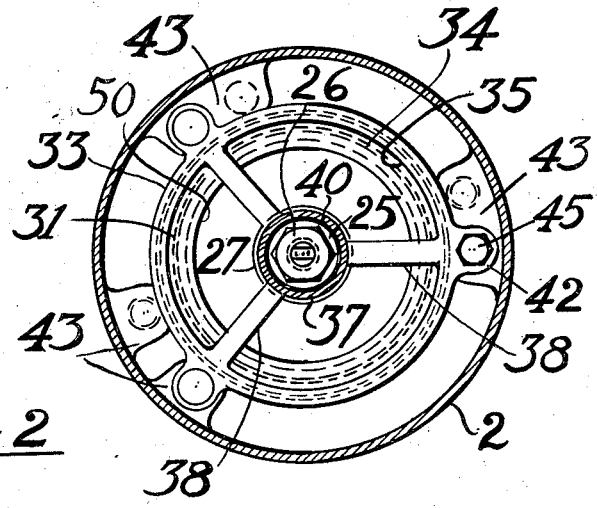
Fig. 2 is a transverse sectional view taken along the line II—II of Fig. 1.
Figure 1:
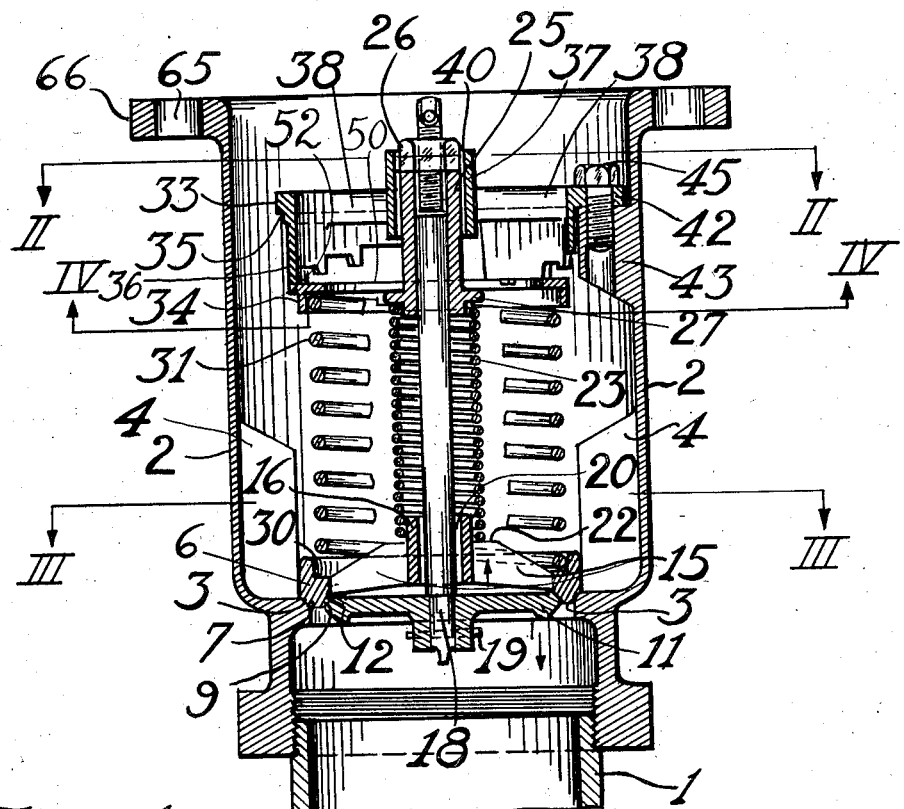
Fig. 1 is a longitudinal sectional view through the valve structure.
Figure 3:
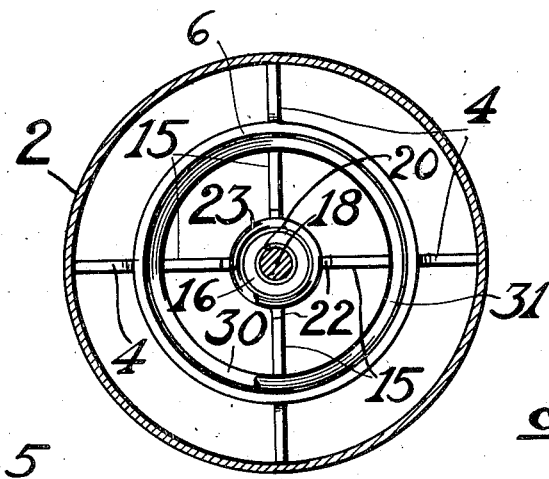
Fig. 3 is a transverse sectional view taken along the line III—III of Fig. 1.
Figure 5:
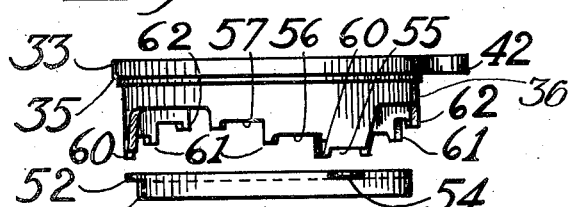
Fig. 5 is a side elevational view of the cylindrical frame.
Figure 6:
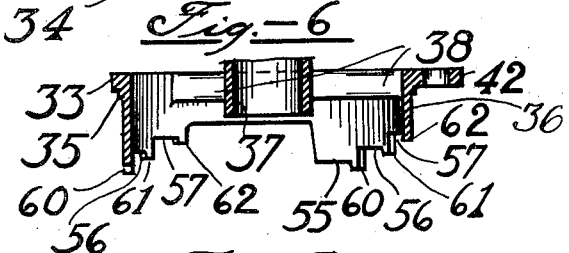
Fig. 6 is a side elevational view of the cylindrical collar.
Figure 8:
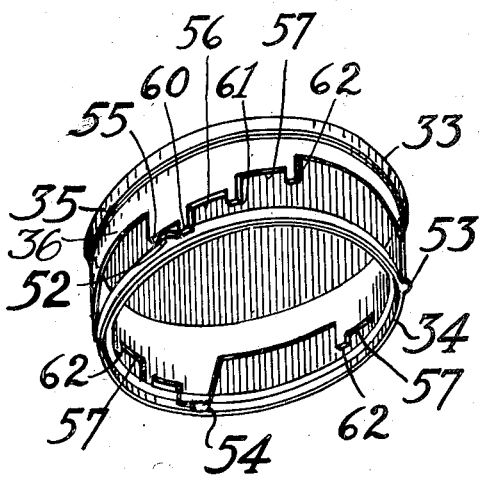
Fig. 8 is a perspective view of the underside of the cylindrical frame and collar in their operative position.
Figure 4:
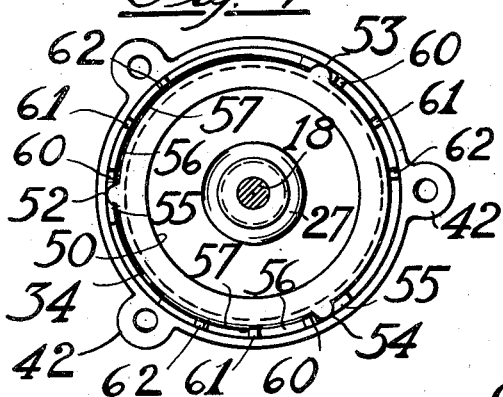
Fig. 4 is a transverse sectional view taken along the line IV—IV of Fig. 1.

Referring particularly to the drawings, reference numeral 1 designates a conduit which is adapted to be connected to a container such as a container of volatile substances, which container may be subjected to greater than atmospheric pressures and to less than atmospheric pressures at varying times. The conduit 1 is provided at its free end with a compound double acting valve which operates both as a vent to allow escape of gas when pressure in the container rises and also to admit air when the pressure in the container is lowered as, for example, when emptying the container. The double acting valve includes a housing 2 which is secured by screw threads, or the like, at one end to the conduit 1. The housing 2 constitutes a valve seat element and is provided intermediate its ends with an annular valve seat 3. Ribs 4 protruding substantially radially inwardly from the valve seat element 2 function as guides for a valve to be later described.

The passage of fluid to and from the conduit 1 is controlled by the following arrangement of parts: The valve seat 3 receives an annular valve 6 of the mushroom type. The valve 6 has an external seating face 7 adapted to cooperate with the valve seat face 3 to open outwardly, that is away from the conduit 1. The valve 6 has an internal seating face or valve-seating 9 which receives a second valve 11 of the mushroom type having an exterior seating face 12 for cooperation with the face 9. The valve 11 is adapted to open inwardly, that is toward the conduit 1.

The annular valve 6 is mounted for reciprocation longitudinally of the valve seat element 2 in engagement with the guides 4. The annular valve 6 is provided with a plurality of arms 15 which protrude substantially radially inwardly from the rim portion 6 of the valve and terminate in a hub 16.

The valve 11 is supported for reciprocating movement longitudinally of the valve seat element 2 by means of a stem or shaft 18 which is secured to the valve 11 by means of a pin 19. The stem 18 extends slidably through the hub 16 to permit of relative movement of the valve 11 with respect to the valve 6. A suitable liner or bearing 20 is provided for the hub 16 formed of material resistant to corrosion by corrosive gases or by sea water. The material of the bearing may be bakelite or the like.

The valve 11 is maintained seated against the annular valve 6 to control the admission of fluid into the conduit 1 through the following arrangement of parts: The arms 15 are provided with substantially radially extending shouldered portions 22 which are adapted to form a seat for a compression spring 23. The spring 23 is a helical spring and of cylindrical shape and is disposed around the stem 18 extending longitudinally of the valve seat element 2. An adjustable abutment is provided for the outer end of the spring 23 to regulate the amount of pressure which the helical spring 23 exerts to pull the valve 11 against its seat 9. The spring 23 is formed of material which is resistant to corrosive gases and to sea water, such material being Monel metal or the like. The abutment comprises a sleeve 25 embracing the stem 18 for longitudinal adjustment upon the stem 18. This adjustment is effected by means of a nut 26 which has screw threaded engagement with the end of the stem 18 and which bears against one end of the sleeve 25. The opposite end of the sleeve 25 is provided with a substantially radially extending shoulder 27 against which the end of the helical spring 23 abuts.

The annular valve 6 is maintained yieldably seated upon the seat 3 through the following arrangement of parts: The annular valve 6 is provided with an annular radially inwardly extending shoulder 30 disposed in spaced relation from the outer end of the annular valve 6 which functions as a seat for a compression spring 31. The spring 31 is a helical spring cylindrical in shape. The spring is maintained in position yieldably forcing the valve 6 against the seat 3 by means of an adjustable abutment frame assembly. The abutment frame assembly comprises a cylindrical frame 33 and a cylindrical collar or retaining ring 34 adjustable longitudinally within the frame 33. The cylindrical frame comprises an annular rim 35 which is supported from a hub 37 by means of spokes 38 and a cylindrical skirt 36 depending from the rim 35. The hub 37 embraces and serves as a guide for the sleeve 25. The hub 37 is provided with a bearing sleeve 40 formed of bakelite or other material which is resistant to corrosion by salt water or corrosive vapors. The cylindrical frame 33 is secured in position within the valve seat element 2 by means of shoulders 42 which protrude outwardly from the annular rim 35 and rest upon shoulders 43 which protrude inwardly from the inner wall of the valve seat element 2. Bolts 45 secure the shoulders 42 and 43 together.

The cylindrical collar 34 is adjustable longitudinally of the valve seat element 2 to vary the compressive force of the sylindrical spring 31 against the annular valve 6 through the following arrangement of parts: The collar 34 is provided with a substantially radially inwardly extending shoulder 50 which functions as a bearing to receive the outer end of the helical spring 31. The collar 34 is provided with lugs 52, 53 and 54 which protrude outwardly from its circumference. A recess 55 is provided in the skirt 36 in front of the lug 60. A recess 56 is provided between the lugs 60 and 61 and a recess 57 is provided between the lugs 61 and 62. The recesses 55, 56 and 57 of cylindrical frame 33 are disposed in stepped relation longitudinally of the frame. The lugs 52, 53 and 54 of ring 34 are adapted to fit into the recesses 55, 56 and 57 in the cylindrical skirt 36 of the frame 33. Adjustment of the position of the collar 34 along the longitudinal axis of the housing 2 is effected by manually inserting the fingers through the cylindrical frame 33 to engage the retaining ring 34 and rotate the retaining ring 34 to cause the lugs 52, 53 and 54 to engage different notches in the skirt 35.

The valve structure is readily accessible for adjustment or repairs when used in connection with the flame arrester described in my copending application Serial No. 734,807 entitled "Flame arresting device" filed July 12, 1934, by removing the hood bolts which pass through openings 65 in the flanged end 66 of the housing 2. Alternatively the housing 2 can be connected to a flanged pipe spool in the case of the pipe line type valve by connecting the pipe spool to the flange 66. The working parts of the valve can be removed from the housing 2 as a unit by unscrewing the brass cap screws 45 holding the guide spider 38 to the housing 2.

The applicant has provided a pressure vacuum valve having two cylindrical springs disposed one within the other and in the same position longitudinally of the valve structure. These springs are entirely independent of each other as regards adjustment and test. This arrangement insures a compact and economical structure and insures maximum flexibility as regards change of springs. The springs are adjustable entirely independently in their assembled position in the valve and without turning any large screw threads which under operating conditions are apt to stick due to corrosion or to accumulation of oil, salt, etc., in the moving parts of the valve structure. The spring 23 which controls the vacuum valve 11 is adjusted by turning the lock nut 26 upon the Monel metal stem 18. The spring 31 which controls the pressure valve is adjusted by means of the retainer ring 34. The adjustment is altered by pressing the ring 34 longitudinally inwardly of the housing 2 a suitable distance such as ⅛" to release the lugs 52, 53 and 54 from the notches in the skirt 35. The ring 34 is released when the ring lugs are opposite the desired notches so that the lugs are forced into the notches by the cylindrical spring 31. The lugs 52, 53 and 54 are guided into the notches by the tapered entrance edges of the notches.

The metals used for the valve elements are particularly designed for marine service where the elements are subjected to the presence of salt moisture in the air and to hydrogen sulfide in the vapors of some crude oils. The stem 18 and the cylindrical helical springs 23 and 31 are constructed of Monel metal. The bushings 20 and 40 are constructed of bakelite. The stem sleeve 25 is constructed of gun metal bronze coated with a chromium plate. All of the other elements of the structure are constructed of gun metal bronze. The springs 23 and 31 are disposed exteriorly of the conduit 1 and these are normally not subjected to the corrosive effects of the tank vapors with which the conduit 1 may communicate, thus protecting the springs from the corrosive vapors except when actually releasing gases or vapors to the atmosphere. The springs are thus exposed only to salt atmosphere. The valve seats 3, 7, 9 and 12 are disposed at an angle of 45° whereby small particles such as rust scale will work off the sloping seats. The cylindrical springs 23 and 31 utilize the various portions of the springs equally, all parts of the springs being equally compressed. The valves are therefore operated with a maximum of efficiency. Full pipe area is maintained open throughout the valve, the only restriction being at the valve seats. The valves open just enough to pass the desired quantity of gas or air at the set pressure. This construction assures a minimum of friction loss or pressure differential across the valve at any given flow rate, practically the entire drop taking place at the valve disc and seat.

Various changes may be made within the scope of the appended claims in which it is desired to claim all novelty inherent in the invention as broadly as the prior art permits.

I claim:

1. In a compound double-action valve, the combination of a valve-seat element provided with means for connection to the end of a conduit, and having on that side which is to face away from the conduit a frame supporting a hub the axis of which is situated centrally relatively to the valve-seating, a valve of the mushroom type mounted concentrically in the valve seat and having an external seating face cooperating with the valve seat to open outward and an internal seating face and a throughway provided with a valve-seating on that side which is towards the conduit, a second mushroom-valve mounted concentrically relatively to the first and bedding on this second valve-seating to open inward, said latter valve having a stem which extends outwardly perpendicularly from it, a compression spring encircling said valve stem with the inner end of the spring abutting against the outwardly opening valve, an annular abutment member for the outer end of the spring, mounted for longitudinal adjustment on the outer end of the valve stem to compress the spring, said abutment member passing through the hub of the frame as a guide and slidably engaging the inner surface thereof, a second compression spring thrust at one end against the frame and controlled at the other end by the outwardly opening valve, the last mentioned spring encircling the first mentioned spring.

2. In a compound double-action valve, the combination of a valve-seat element provided with means for connection to the end of a conduit, and having on that side which is to face away from the conduit a cylindrical frame supporting a hub the through axis of which is situated centrally relatively to the valve seating, the cylindrical frame having shouldered portions disposed in stepped relation longitudinally of the frame, a valve of the mushroom type mounted concentrically in the valve seat and having an external seating face cooperating with the valve seat to open outward and an internal seating face and a throughway provided with a valve-seating on that side which is toward the conduit, a second mushroom-valve mounted concentrically relatively to the first and bedding on this second valve-seating to open inward, said valve having a stem which extends outward perpendicularly from it and passes through the hub as a guide and is provided with an abutment, a compression spring operating between the abutment and the outwardly opening valve, a cylindrical collar having a shoulder adapted to engage with a given shouldered portion of the cylindrical frame whereby the collar is adjusted longitudinally of the cylindrical frame, and a second compression spring thrust at one end against the cylindrical collar and controlled at the other end by the outwardly opening valve.

3. In a compound double-action valve, the combination of a valve-seat element provided with means for connection to the end of a conduit, and having on that side which is to face away from the conduit a cylindrical frame supporting a hub the through axis of which is situated centrally relatively to the valve-seating, the cylindrical frame having shouldered portions disposed in stepped relation longitudinally of the frame, a valve of the mushroom type mounted concentrically in the valve seat and having an external seating face cooperating with the valve seat to open outward and an internal seating face and a throughway provided with a valve-seating on that side which is toward the conduit, a second mushroom valve mounted concentrically relatively to the first and bedding on this second valve-seating to open inward, said valve having a stem which extends outward perpendicularly from it and passes through the hub and carries an abutment adjustable longitudinally of the stem, a cylindrical compression spring operating between the abutment and the outwardly opening valve, a cylindrical collar having a shoulder engaging selected shouldered portions of the cylindrical frame whereby the collar is maintained in adjusted position longitudinally of the frame, and a second cylindrical compression spring thrust at one end against the cylindrical collar and controlled at the other end by the outwardly opening valve, the last mentioned cylindrical spring encasing the first mentioned cylindrical spring.

4. A compound double action valve, comprising a casing having a valve seat element adjacent one end thereof, means for securing said casing to a conduit, an annular valve element having an exterior valve face that is adapted to cooperate with said valve seat and effect sealing engagement therebetween, said valve element having a central hub member and also having an internal valve seat, a valve disc, having a peripheral face, adapted to cooperate with said internal valve seat, said disc member being mounted adjacent one end of a shaft which extends through said hub member, an adjustable sleeve, having a terminal abutment member, carried on the other end of said shaft, means for longitudinally adjusting said sleeve on said shaft, a spring interposed between said annular valve element and said abutment member that is adapted to normally maintain such valve disc in contact with its seat on said valve element, a second abutment member encircling said shaft and movable with respect thereof, a cylindrical frame carried by said casing and having a relative telescoping relation with said latter abutment member, cooperating means on said frame and said second abutment member, including radially projecting lugs carried by said second abutment member and two opposing series of staggered notches formed on the periphery of said frame for admitting of quick adjustment of said second abutment member and a compression spring interposed between said second abutment member and first mentioned annular valve element.

5. In a double action valve, the sub-combination comprising a casing having two valve seats therein, two valve elements each having a spring associated therewith adapted to normally under the urge of such springs to respectively engage said seats, and means for quickly adjusting said springs, including a longitudinally movable abutment collar and a rigidly mounted frame, the said collar having lugs laterally projecting therefrom and said frame having two series of cooperating staggered notches.

GEORGE H. JETT.